(12) United States Patent
Okuno et al.

(10) Patent No.: US 7,697,261 B2
(45) Date of Patent: Apr. 13, 2010

(54) METALIZED FILM CAPACITOR AND INVERTER SMOOTHING CAPACITOR FOR AUTOMOBILE

(75) Inventors: Shigeo Okuno, Toyama (JP); Kohei Shiota, Hyogo (JP); Kazuhiro Nakatsubo, Toyama (JP)

(73) Assignee: Panasonic Corporation, Osaka (JP)

( * ) Notice: Subject to any disclaimer, the term of this patent is extended or adjusted under 35 U.S.C. 154(b) by 203 days.

(21) Appl. No.: 11/883,076

(22) PCT Filed: Jan. 23, 2006

(86) PCT No.: PCT/JP2006/300933
§ 371 (c)(1),
(2), (4) Date: Jul. 26, 2007

(87) PCT Pub. No.: WO2006/112099
PCT Pub. Date: Oct. 26, 2006

(65) Prior Publication Data
US 2008/0259522 A1    Oct. 23, 2008

(30) Foreign Application Priority Data
Apr. 8, 2005    (JP) .............................. 2005-112039

(51) Int. Cl.
H01G 4/015    (2006.01)
H01G 4/005    (2006.01)

(52) U.S. Cl. ...................................... 361/273; 361/303

(58) Field of Classification Search ............... 361/272, 361/273, 323, 304, 306.3, 306.2, 306.1, 305, 361/301.5, 301.4, 301.3, 301.2, 301.1, 313, 361/306, 311, 303
See application file for complete search history.

(56) References Cited

U.S. PATENT DOCUMENTS

| 6,370,008 | B1 | 4/2002 | Vetter | |
| 6,631,068 | B1 * | 10/2003 | Lobo | 361/273 |
| 2004/0232465 | A1 | 11/2004 | Shiota et al. | |

FOREIGN PATENT DOCUMENTS

| JP | 62-183506 | | 8/1987 |
| JP | 10-041187 | | 2/1998 |
| JP | 11045820 A | * | 2/1999 |
| JP | 2002-367854 | | 12/2002 |
| JP | 2004-134561 | | 4/2004 |
| JP | 2005-012082 | | 1/2005 |
| WO | 99/43011 | | 8/1999 |
| WO | WO 2004034412 A1 | * | 4/2004 |

* cited by examiner

Primary Examiner—Eric Thomas
Assistant Examiner—David M Sinclair
(74) Attorney, Agent, or Firm—Wenderoth, Lind & Ponack, L.L.P.

(57) ABSTRACT

A metalized film capacitor includes a metal deposition electrode on a dielectric film. The metal deposition electrode includes slits provided and divided only at a side opposite to low resistance portions connected to a metalized contact, and fuses provided between the slits. In a laminated metalized film, slits provided at a central portion in a width direction of the metalized deposition electrode and extending in the longitudinal direction of the dielectric film do not overlap with each other.

4 Claims, 5 Drawing Sheets

FIG. 6A – PRIOR ART
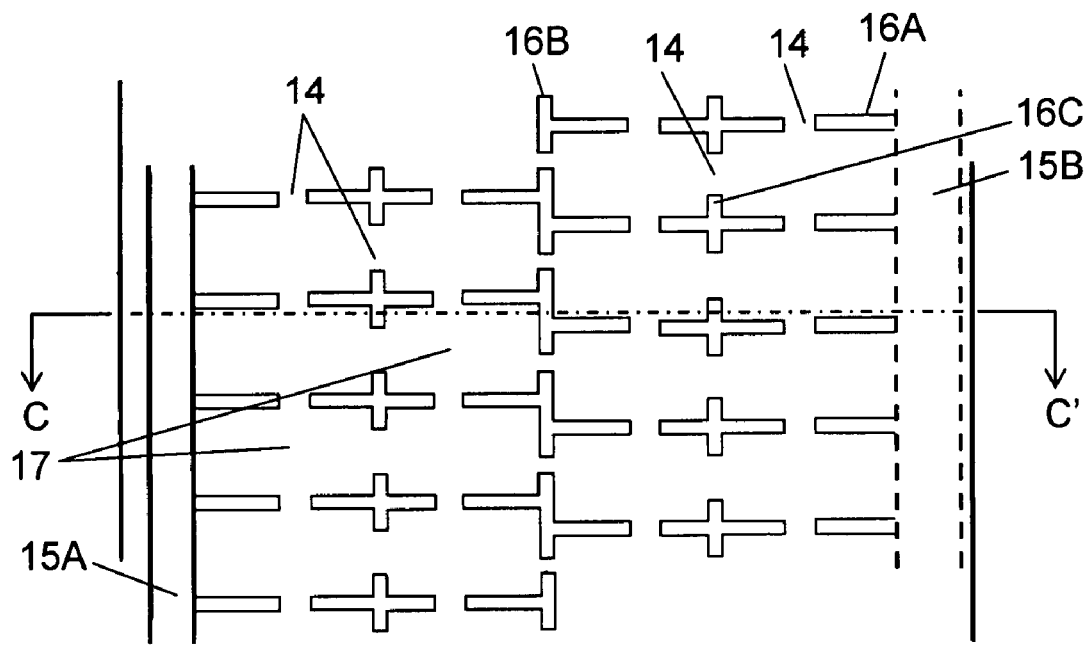
FIG. 6B – PRIOR ART
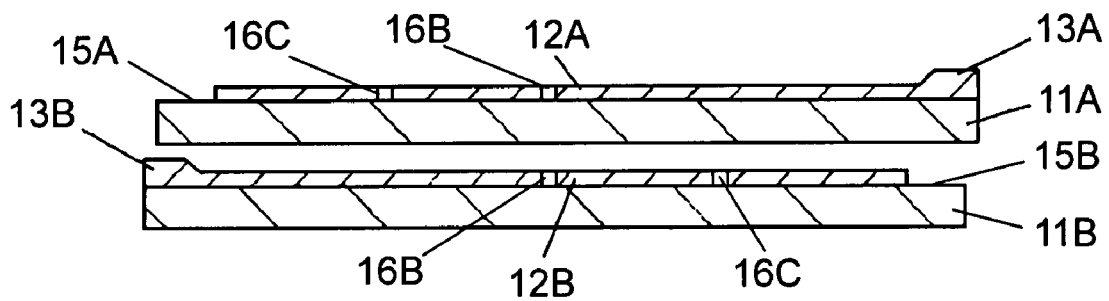

FIG. 7A – PRIOR ART
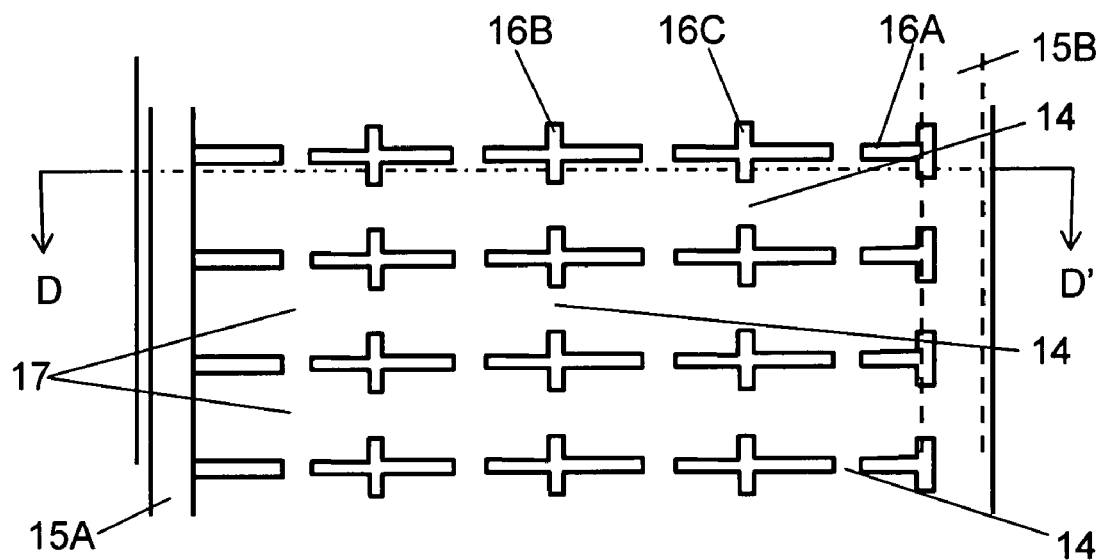
FIG. 7B – PRIOR ART
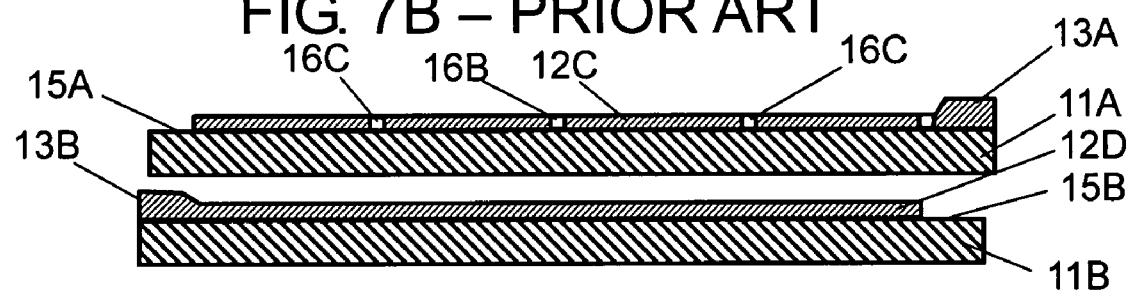

METALIZED FILM CAPACITOR AND INVERTER SMOOTHING CAPACITOR FOR AUTOMOBILE

TECHNICAL FIELD

The present invention relates to a metalized film capacitor used in electric devices, various power supply circuits, communication devices, vehicles including electric automobiles, and so on.

BACKGROUND ART

Conventionally, an electrode of an electrode drawing portion in a wound plastic film capacitor having a self-security mechanism is formed to be thick. This increases strength of contact with a metalized contact which is an electrode introducing portion. Such a film capacitor is disclosed in Japanese Patent Unexamined Publication No. S62-183506.

There has been known a self-security mechanism in which microscopic blocks are formed in a deposited electrode using slits in which metal is not deposited, and fuses provided between the slits are connected between the microscopic blocks, with divided electrodes interconnected in parallel. There has been also recently known a self-security mechanism that employs a divided electrode pattern having slits provided in the form of a lattice. In addition, Japanese Patent Unexamined Publication No. 2004-134561 discloses a self-security mechanism pattern having the characteristic that fuses emit little heat and the amount of reduction of their capacitance is low when current flows.

FIGS. 6A to 7B are schematic views showing conventional metalized film capacitors. FIG. 6A is a perspective plan view of a conventional metalized film capacitor, FIG. 6B is a sectional view taken along line C-C' of FIG. 6A, FIG. 7A is a perspective plan view of another conventional metalized film capacitor, and FIG. 7B is a sectional view taken along line D-D' of FIG. 7A.

In the structure shown in FIGS. 6A and 6B, high resistance portions 12A and 12B and low resistance portions 13A and 13B, both of which are formed of metal deposition films, are respectively provided on dielectric films (hereinafter abbreviated as films) 11A and 11B such as polypropylene films. First slits 16B, second slits 16A and third slits 16C are provided in high resistance portions 12A and 12B. Portions between the slits function as fuses 14. Microscopic blocks 17 are surrounded by the slits.

A metalized contact (not shown) as an electrode drawing portion is welded to low resistance portions 13A and 13B at the sides of films 11A and 11B. Accordingly, low resistance portions 13A and 13B are formed to be thicker than high resistance portions 12A and 12B, and has low film resistance. Band-shaped portions 15A and 15B, on which metal is not deposited, are provided as insulation margins on films 11A and 11B such that short-circuit between the metal deposition films on films 11A and 11B does not occur when the metalized contact is welded. First slits 16B, second slits 16A and third slits 16C are provided at the center in the width direction of films 11A and 11B or at a side closer to band-shaped portions 15A and 15B than the center.

In the structure shown in FIGS. 7A and 7B, an electrode pattern in high resistance portions 12C and 12D is different from that shown in FIGS. 6A and 6B. That is, first slits 16B, second slits 16A and third slits 16C are provided in the entire width direction of high resistance portion 12C, and no slit is provided in high resistance portion 12D.

Fuses 14 function as a self-security mechanism in the metalized film capacitor shown in FIGS. 6A and 6B. However, when films 11A and 11B, in which the slits are provided in this manner, are laminated to form the capacitor, fuses 14 provided at the center in the width direction of laminated films 11A and 11B overlap with each other. That is, first slits 16B provided at upper film 11A and lower film 11B overlap with each other. Accordingly, fuses 14 provided in first slits 16B overlap with each other, too. A good deal of heat is locally generated in this overlap portion when large current flows.

On the other hand, in the metalized film capacitor shown in FIGS. 7A and 7B, fuses 14 are provided in the entire of high resistance portion 12C, and fuses 14 are also formed at a side closer to an electrode drawing portion than the center in the width direction of film 11A. The heat generation at fuses 14 on the side of the electrode drawing portion is large.

The conventional film capacitors having the structure as described above generate a lot of heat, which results in reduction of the lifetime of the capacitor and non-uniformity in operation of fuses 14 as the self-security mechanism.

DISCLOSURE OF THE INVENTION

According to an aspect of the invention, a metalized film capacitor includes metal deposition electrodes in upper and lower sides of dielectric films. The metal deposition electrodes include slits provided and divided only at a side opposite to low resistance portions connected to a metalized contact, and fuses are provided between the slits. Since fuses of a self-resistance mechanism are not provided at the low resistance portions, operability of the fuses is improved. It is possible to widen a range of fuse width to secure fuse operability, which leads to improvement of manufacturing yield. In addition, in a laminated metalized film, slits provided at the center in the width direction of metalized deposition electrodes and extending in the longitudinal direction of dielectric films do not overlap with each other. Accordingly, since fuses do not overlap with each other, the fuses are apt to emit heat and their non-uniformity in operation is little.

BRIEF DESCRIPTION OF THE DRAWINGS

FIG. 6A is a perspective plan view showing a configuration of a conventional metalized film capacitor.

FIG. 6B is a sectional view of the metalized film capacitor shown in FIG. 6A.

FIG. 7A is a perspective plan view showing a configuration of another conventional metalized film capacitor.

FIG. 7B is a sectional view of the metalized film capacitor shown in FIG. 7A.

REFERENCE MARKS IN THE DRAWINGS

1: FIRST DIELECTRIC FILM
1A, 1B: SECOND DIELECTRIC FILM
2: FIRST HIGH RESISTANCE PORTION
2A: SECOND HIGH RESISTANCE PORTION
3: FIRST LOW RESISTANCE PORTION
3A: SECOND LOW RESISTANCE PORTION
4: FIRST FUSE
4A: SECOND FUSE
4B, 4C: FUSE ANGLED PORTION
4D: FLAT PORTION
5: FIRST BAND-SHAPED PORTION (INSULATION MARGIN)
5A: SECOND BAND-SHAPED PORTION (INSULATION MARGIN)
6B: FIRST SLIT
6A: SECOND SLIT
6C: THIRD SLIT
6X: FOURTH SLIT
6E: FIFTH SLIT
6D: SIXTH SLIT
6F: SEVENTH SLIT
6Y: EIGHTH SLIT
6G: WIDTH OF FIRST SLIT
7, 7A: MICROSCOPIC BLOCK
8: METALIZED CONTACT
11A, 11B: DIELECTRIC FILM
12A, 12B, 12C, 12D: HIGH RESISTANCE PORTION
13A, 13B: LOW RESISTANCE PORTION
14: FUSE
15A, 15B: BAND-SHAPED PORTION (INSULATION MARGIN)
16B: FIRST SLIT
16A: SECOND SLIT
16C: THIRD SLIT
17: MICROSCOPIC BLOCK

DETAILED DESCRIPTION OF PREFERRED EMBODIMENTS

Figure 1:
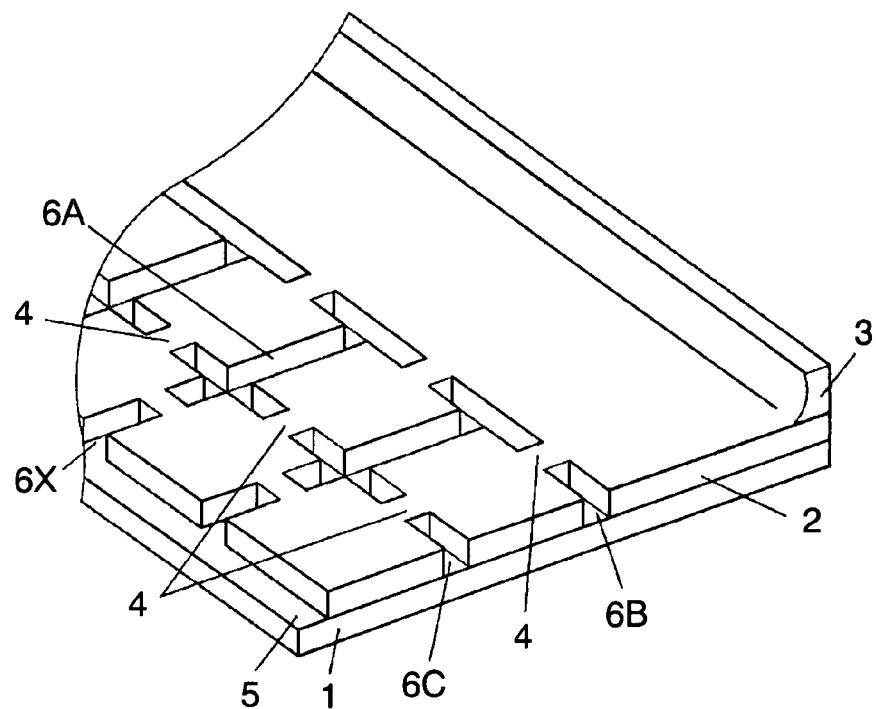
FIG. 1 is a perspective view of a metalized film according to an embodiment of the invention.
Figure 2A:
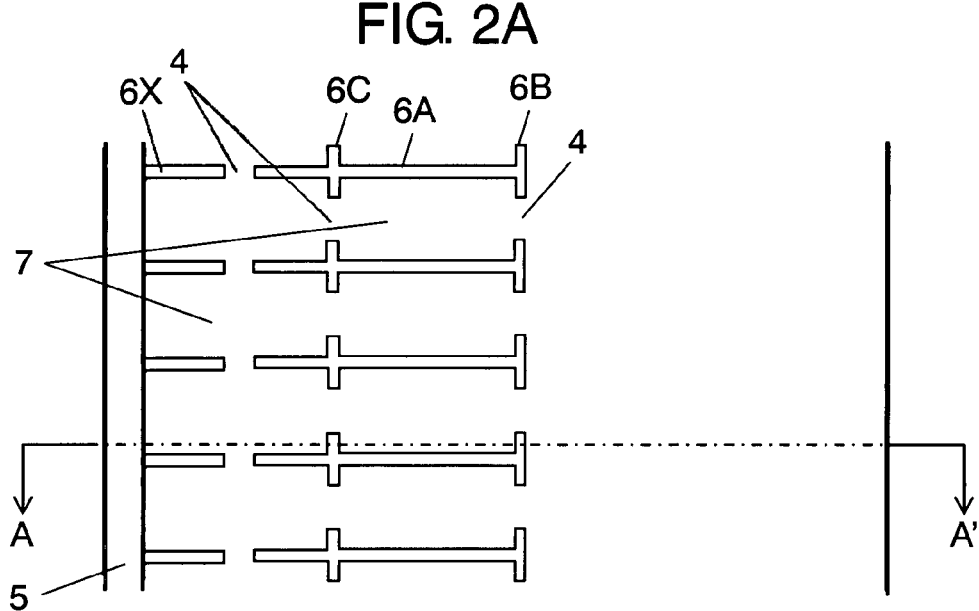
FIG. 2A is a plan view of the metalized film shown in FIG. 1.
Figure 2B:
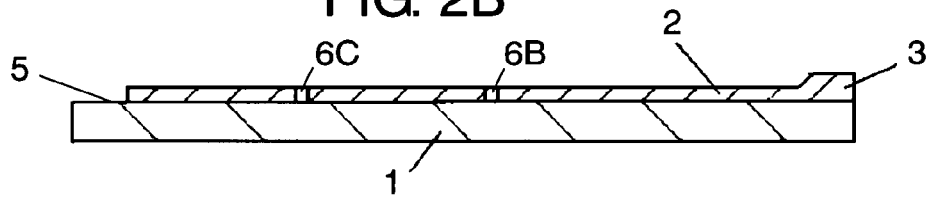
FIG. 2B is a sectional view of the metalized film shown in FIG. 2A.
Figure 3A:
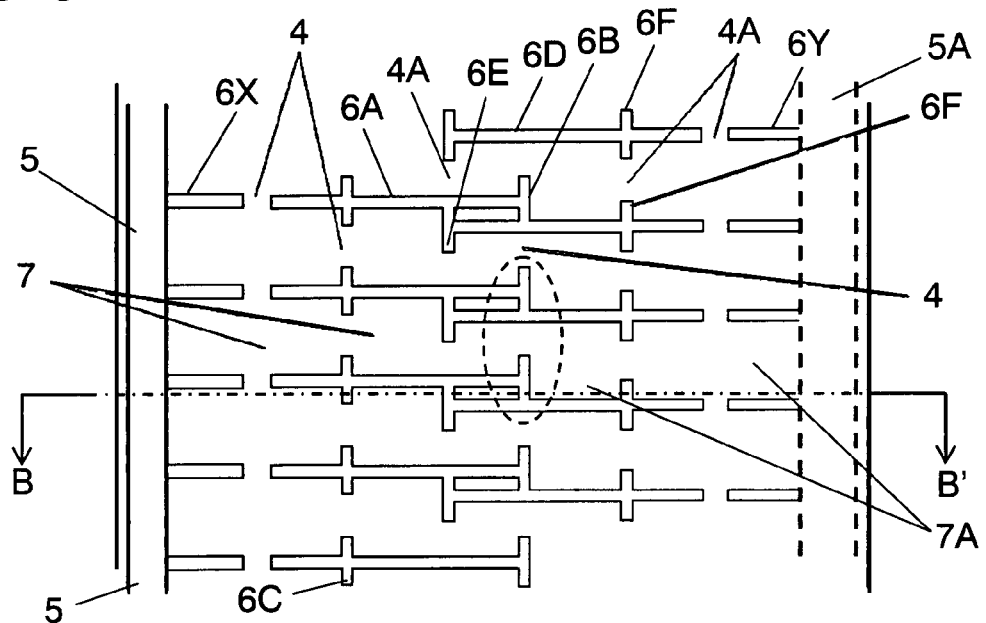
FIG. 3A is a perspective plan view showing a configuration of a metalized film capacitor using the metalized film shown in FIG. 1.
Figure 3B:
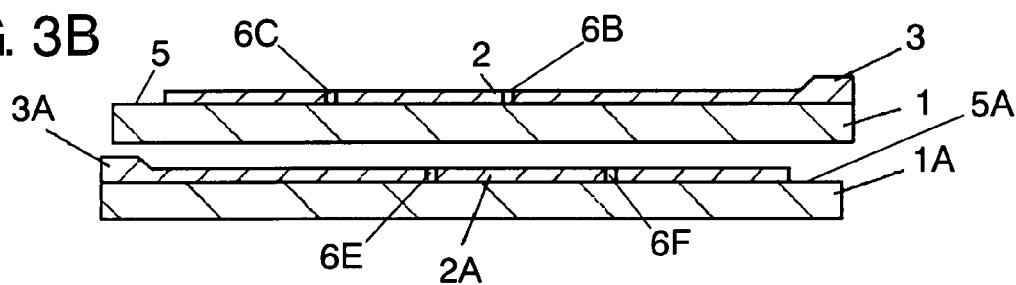
FIG. 3B is a sectional view of a main portion of the metalized film capacitor shown in FIG. 3A.
Figure 3C:
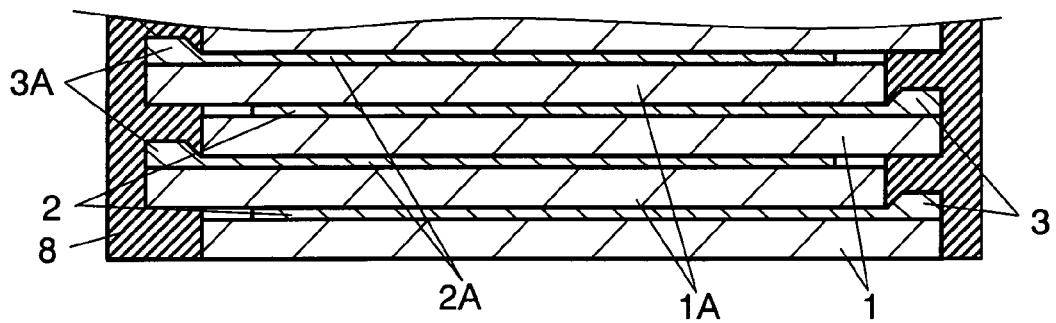
FIG. 3C is a sectional view of the metalized film capacitor shown in FIG. 3A.
Figure 3D:
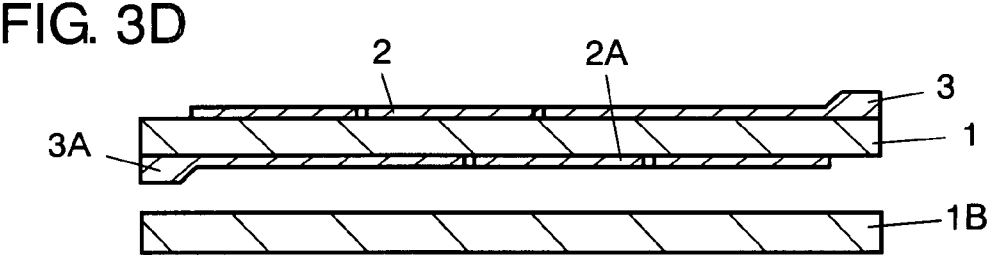
FIG. 3D is a sectional view of a main portion of a metalized film capacitor according to another embodiment of the invention.

FIG. 1 is a perspective view of a metalized film according to an embodiment of the invention, FIG. 2A is a plan view of the metalized film shown in FIG. 1, and FIG. 2B is a sectional view taken along line A-A' of FIG. 2A. FIG. 3A is a transparent plan view of a metalized film capacitor on which the metalized film shown in FIGS. 1 to 2B is laminated. FIG. 3B is a sectional view taken along line B-B' of FIG. 3A. FIG. 3C is a sectional view of the film capacitor formed using the metalized film shown, in FIG. 1.

First metal deposition electrode including first high resistance portion (hereinafter abbreviated as high resistance portion) 2 and first low resistance portion (hereinafter abbreviated as low resistance portion) 3 are provided on a top surface as a first surface of first dielectric film (hereinafter abbreviated as film) 1 such as a polypropylene film. Low resistance portion 3 is formed along a first side in the longitudinal direction of film 1. First slits (hereinafter abbreviated as slits) 6B, second slits (hereinafter abbreviated as slits) 6A, third slits (hereinafter abbreviated as slits) 6C and fourth slits (hereinafter abbreviated as slits) 6X are provided at high resistance portion 2 to form an electrode pattern. Microscopic blocks 7 are surrounded by the slits. Such an electrode pattern is manufactured by forming the slits as non-deposited portions by patterning oil on the top surface of film 1 using a transfer method or the like and then depositing metal thereon, for example. The method of manufacturing the electrode pattern is not particularly limited.

As shown in FIG. 3C, metalized contact 8 as an electrode drawing portion is welded to low resistance portion 3 at a side of film 1. Accordingly, low resistance portion 3 is formed to be thicker than high resistance portion 2 and has resistance lower than other portions of the first metal deposition electrode. Band-shaped portion 5 on which metal is not deposited is provided as an insulation margin on the top surface of film 1 along a second side facing the first side, the second side being opposite to low resistance portion 3, such that short-circuit does not occur when the metalized contact 8 is welded.

In this embodiment, slits 6A are provided only at a side closer to band-shaped portion 5 than low resistance portion 3, and first fuses (hereinafter abbreviated as fuses) 4 are provided between slits 6A. For slits 6B and slits 6C, fuses 4 are provided to be connected to microscopic blocks 7, thereby forming divided electrodes. That is, a plurality of slits 6B are provided at substantially regular intervals in a central portion in the direction from the first side to the opposite second side of film 1 (width direction of film 1). Slits 6B extend in a direction perpendicular to the direction from the first side to the second direction (length direction of film 1). Slits 6A communicate with slits 6B, respectively, and are provided closer to the second side of film 1 than slits 6B, and extend in the direction from the first side to the second side (the width direction of film 1). A plurality of slits 6C provided at substantially regular intervals communicate with slits 6A and extend in a direction parallel to slits 6B. Slits 6X are provided at positions, where slits 6A extend with intervals from slits 6A and are opened at the second side of the first metal deposition electrode. Fuses 4 are provided between slits 6B, between slits 6C, and between slits 6A and 6X.

Next, a configuration of a film capacitor according to an embodiment of the present invention is described with reference to FIGS. 3A, 3B and 3C. Second dielectric film (hereinafter abbreviated as film) 1A at a lower side has the same structure as film 1 described with reference to FIGS. 1 to 2B. As shown in FIGS. 3A and 3B, low resistance portion 3 is laminated on band-shaped portion 5A, and low resistance portion 3A is laminated on band-shaped portion 5. Second metal deposition electrode including second high resistance portion (hereinafter abbreviated as high resistance portion) 2A and second low resistance portion (hereinafter abbreviated as low resistance portion) 3A is provided on a top surface of film 1A such as a polypropylene film. Low resistance portion 3A is arranged at a second surface as a bottom surface of film 1 in parallel to the second side. Fifth slits (hereinafter abbreviated as slits) 6E corresponding to slits 6B, sixth slits (hereinafter abbreviated as slits) 6D corresponding to slits 6A, seventh slits (hereinafter abbreviated as slits) 6F corresponding to slits 6C, and eighth slits (hereinafter abbreviated as slits) 6Y corresponding to slits 6X are provided in high resistance portion 2A. Microscopic blocks 7A are surrounded by the slits. Band-shaped portion 5A on which metal is not deposited is provided as an insulation margin in the opposite side to low resistance portion 3A. That is, the second metal deposition electrode is provided at the second surface facing the first surface of film 1 such that the second metal deposition electrode is not opened to the first side. Slits 6D are provided only at a side closer to band-shaped portion 5A than low resistance portion 3A, and second fuses (hereinafter abbreviated as fuses) 4A are provided between slits 6D and slits 6Y.

For slits 6E and slits 6F, fuses 4A are provided to be connected to microscopic blocks 7A, thereby forming divided electrodes.

That is, a plurality of slits 6E are provided at substantially regular intervals in a central portion in the direction from the first side to the opposite second side of film 1, and extend in a direction perpendicular to the direction from the first side to the second direction. Slits 6D communicate with slits 6E, respectively, and are provided closer to the first side of film 1 than slits 6E, and extend in the direction from the second side to the first side. A plurality of slits 6F provided at substantially regular intervals communicate with slits 6D and extend in a direction parallel to slits 6E. Slits 6Y are provided at positions, where slits 6D extend, with intervals from slits 6D and are opened at the first side of the second metal deposition electrode. Fuses 4A are provided between slits 6E, between slits 6F, and between slits 6D and 6Y.

As shown in FIG. 3A, slits 6B provided on film 1 do not overlap with slits 6E provided on film 1A. That is, slits 6B deviate from slits 6E in the direction from the first side to the second side. After further winding these films 1 and 1A, metal is thermal-sprayed on both sides of films 1 and 1A, metalized contact 8 as external electrode drawing portions connected to low resistance portions 3 and 3A, respectively, are formed to complete a metalized film capacitor, as shown in FIG. 3C. Metalized contacts 8 are insulated from each other.

In the above configuration, films 1 and 1A are laminated so that slits 6B and 6E do not overlap with each other. Accordingly, even if a great deal of heat is generated when large current flows, operability of fuses 4 as the self-security mechanism becomes stable without having an effect on heat on fuses 4.

For slits 6A in high resistance portion 2, fuses 4 are provided only in microscopic blocks 7 at the side of band-shaped portion 5. Accordingly, as shown in FIG. 2A, two fuses 4 are connected to one microscopic block 7 constructed by three slits 6A, 6B and 6C. Therefore, current flowing through fuses 4 connected to one microscopic block 7 increases, and operability of fuses 4 near the central portion in the width direction of films 1 and 1A where heat is generated at the maximum is enhanced. Since the divided electrodes are provided in the form of a lattice, a withstand voltage increases and reduction of capacitance is suppressed. These effects are equally applied to high resistance portion 2A.

Although slits 6B and 6E do not overlap with each other, it is preferable that a distance between them falls within 10% of the width of film 1. This suppresses capacitance from being reduced due to reduction of an effective electrode area.

In this embodiment, metal is deposited on only one surface of each of films 1 and 1A. Alternatively, metal is deposited on both surfaces of film 1, high resistance portions 2 and 2A and low resistance portions 3 and 3A are provided in both surfaces, and then film 1 is laminated on second dielectric film 1B on which metal is not deposited. This makes it possible to reduce a distance between high resistance portions 2 and 2A and increase capacitance of the capacitor. It is possible to make the film capacitor smaller by using a thin film as dielectric film 1B.

In the conventional film capacitors, in many cases, a thick dielectric film is used as measures against heat. On the contrary, in this embodiment, films 1 and 1A may be thin. Accordingly, a potential gradient can be increased depending on the thickness of film 1, and particularly, it is possible to use the film capacitor of this embodiment for vehicle inverter smoothing capacitors under high temperature use environments.

Figure 4:
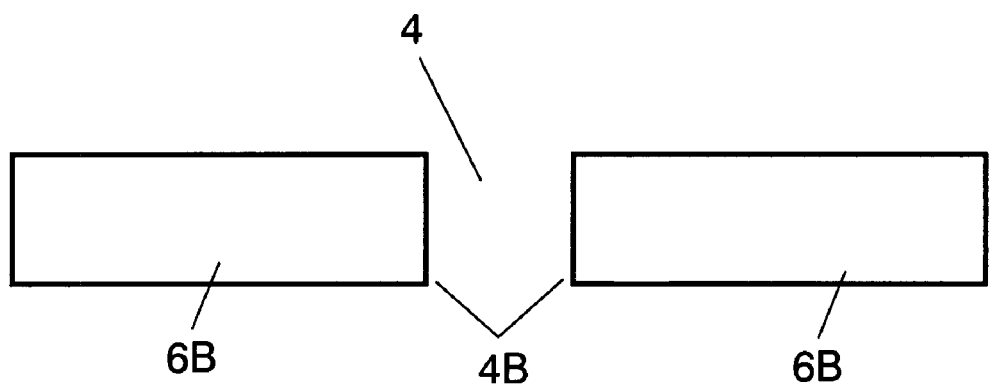
FIG. 4 is a plan view of a fuse according to an embodiment of the invention.

Next, shapes of slits 6B, 6E, 6D, 6F, 6Y, 6A, 6X and 6C are described. FIG. 4 is a plan view of fuse 4 (indicated by a dashed line) provided between slits 6B in FIG. 3A. Heat transferred from film 1 is concentrated on an angled portion 4B of fuse 4. Fuse 4 may be cut by this heat concentration. Thus, fuse 4 may become irregular in its operability.

Figure 5:
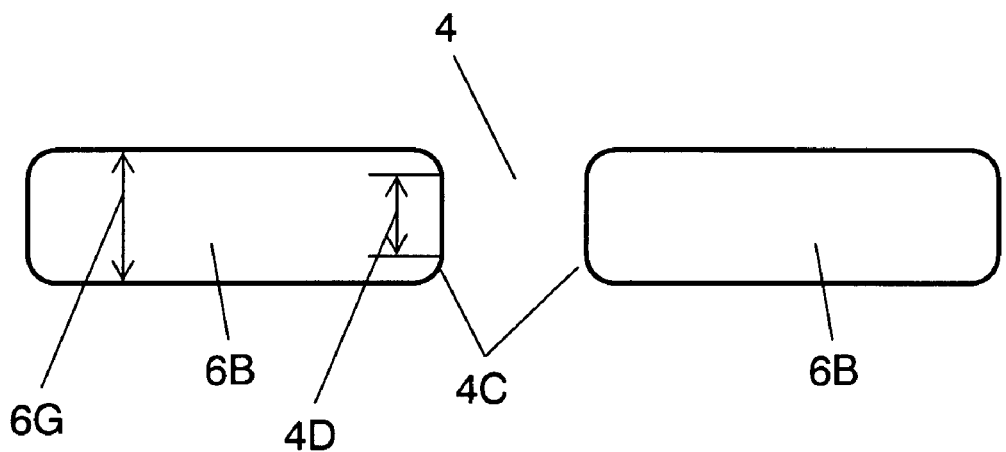
FIG. 5 is a plan view of a fuse according to another embodiment of the invention.

FIG. 5 is a plan view showing angled portion 4C having a round shape. Angled portion 4C having the round shape makes it possible to reduce operation variety of fuse 4 without concentrating heat transferred from film 1 on the angled portion. Thus, it is preferable to make angled portion 4C of fuse 4 round.

In this case, it is more preferable that flat portion 4D of fuse 4 other than angled portion 4C has a length not shorter than a half of a width 6G of slit 6B. This makes it possible to reduce an area on which heat is concentrated and makes operability of fuse 4 more reliable.

The above description about slit 6B is equally applied to slits 6E, 6D, 6F, 6Y, 6A, 6X and 6C.

Hereinafter, effects of the present invention are described using specified samples.

As sample 1, a capacitor using 3 μm thick and 100 mm wide polypropylene films as films 1 and 1A, having a withstand voltage of 750 V DC and capacitance of 100 μF and having the structure shown in FIGS. 1 to 3C is manufactured for test. Hereinafter, a configuration of film 1 is represented. High resistance portion 2 is formed by depositing aluminum, and low resistance portion 3 is formed by depositing zinc in addition to aluminum. Division margin width as the distance between slits 6B and slits 6C is set to be 10 mm and the length of fuses 4 is set to be 0.3 mm. In this case, the shape of lead edges of fuses 4 is as shown in FIG. 5, the width 6G is set to be 0.3 mm, and the radius of the angled portion 4C is set to be 0.05 mm. The distance between fuses 4 and 4A in the central portion of film width direction when two films 1 and 1A are paired is set to be 3 mm. After the pair of films 1 and 1A is wound, sample 1 is manufactured by thermal spraying metalized contact 8 on low resistance portions 3 and 3A.

Next, as sample 2, a capacitor having the electrode pattern as shown in FIG. 6A is manufactured for test in the same way as sample 1. A difference between sample 2 and sample 1 is that fuses 14 in upper high resistance portion 12A and lower high resistance portion 12B in the central portion in the film width direction overlap with each other in sample 2.

Next, as sample 3, a capacitor having the electrode pattern as shown in FIG. 7 is manufactured for test in the same way as sample 1. This capacitor is formed by pairing film 11A provided with high resistance portion 12C having a pattern in which division margin width as the distance between first slits 16B and third slits 16C is set to be 10 mm and the length of fuses 14 is set to be 0.3 mm, and film 11B provided with high resistance portion 12D having no electrode pattern.

A temperature rising test for these samples is carried out by flowing ripple current of 10 Arms-30 Arms.

Test results are listed in Table 1. The temperature measurement is made in the core of the capacitor and the central portion of the width direction.

TABLE 1

|  | 10 Arms | 20 Arms | 30 Arms |
| --- | --- | --- | --- |
| Sample 1 | 2.4K | 9.4K | 20.8K |
| Sample 2 | 3.3K | 13.4K | 25.6K |
| Sample 3 | 4.5K | 17.2K | 40.1K |

As shown in Table 1, sample 2 and sample 3 increase more in temperature than sample 1. It is believed that sample 2 generates more heat since fuses 14 overlap with each other in the central portion in the film width direction. Sample 3 is provided with fuses 14 in the width direction of high resistance portion 12C and at the side of electrode drawing portion. It is believed that much heat is generated from fuses 14 at the side of electrode drawing portion, which promotes increase of temperature of the capacitor.

The primary reason why samples 1 and 2 increase less in temperature than sample 3 is that current flowing through fuses on a current path is small. As heat is proportional to about the square of current, the biggest factor of suppressing heat is to flow current through fuses a little. In this way, by suppressing heat, the capacitor is improved in its heat resistance and can be used in a high temperature range, for example, in the field of automobile.

Next, a voltage step-up test at 100° C. and 110° C. is carried out to confirm safety in a high temperature range by flowing ripple current of 20 Arms. In the voltage step-up test, a voltage is stepped up at a rate of 50V/1 h and is increased until capacitance is about 0. Results are listed in Table 2.

TABLE 2

|  | 100° C. | 110° C. |
| --- | --- | --- |
| Sample 1 | 5 Operated/5 in total | 5 Operated/5 in total |
| Sample 2 | 5 Operated/5 in total | 3 Operated, 2 broken/5 in total |
| Sample 3 | 5 Operated/5 in total | 1 Operated, 4 broken/5 in total |

As shown in Table 2, self-security mechanisms of all samples 1-3 are operated at 100° C., while capacitors of samples 2 and 3 are broken at 110° C. In several test objects of samples 2 and 3, increase of internal temperature of capacitor is high due to heat by ripple current, and operability of self-security mechanisms is deteriorated. On the other hand, in sample 1 according to the embodiment of the invention, the self-security mechanisms are all operated at 110° C. That is, it can be seen that the capacitor of the present invention has improved heat resistance.

Next, as sample 4, a capacitor having a leading edge of the shape of slit angled portion 4B as shown in FIG. 4 is manufactured. The leading edge shape of the slit as shown in FIG. 4 is angled. With test objects of sample 4 together with sample 1 formed with the slit having the round angled portion 4C as shown in FIG. 5, a current withstand test for fuses 4 is carried out. As test results, the number of fuse cuttings are listed Table 3.

TABLE 3

|  | 600 A | 800 A | 1000 A | 1200 A |
| --- | --- | --- | --- | --- |
| Sample 1 | 0/5 | 0/5 | 0/5 | 5/5 |
| Sample 2 | 0/5 | 0/5 | 1/5 | 2/5 |

As shown in Table 3, fuses are all cut at 1200 A in the test objects of sample 1 while fuses are cut from 1000 A and some fuses are not cut even at 1200 A in sample 4. Like this, sample 4 has variety in fuse strength.

In fuses 4 of sample 4, heat is concentrated on fuse angled portion 4B. That is, for the fuse strength, only one minimum distance of fuse angled portion 4B which is a leading edge is reflected on fuse operation. Accordingly, it is believed that variety of the minimum distance is directly reflected on variety of fuse strength. On the other hand, sample 1 has stable fuse strength, and thus, a capacitor with very good operability of self-security mechanism can be obtained.

Although the embodiment of the present invention uses the polypropylene film as films 1 and 1A, the invention is not limited to this. Other plastic films such as polyethyleneterephthalate (PET), polyphenylene sulfide (PPS) or polyethylenenaphthalate (PEN) may be used as films 1 and 1A.

Although it has been illustrated in the embodiment of the present invention that two microscopic blocks 7 are provided as the electrode pattern having the self-security mechanism in the width direction of film 1, as shown in FIGS. 2A and 3A, the same effect can be obtained even when three or more microscopic blocks 7 are provided in the width direction of film 1 and the total number of slits 6B and 6C as electrode dividing portions are three or more.

The metalized film capacitor according to the embodiment of the present invention has high operability of fuses 4 and 4A under high temperature use environments. Accordingly, the metalized film capacitor can be used as a smoothing capacitor in an inverter for a vehicle under high temperature use environments.

INDUSTRIAL APPLICABILITY

The metalized film capacitor related to the present invention has high operability of fuses under high temperature use environments. Accordingly, the metalized film capacitor can be applied to a smoothing capacitor or the like in an inverter for a vehicle.

The invention claimed is:
1. A metalized film capacitor comprising:
a first dielectric film having a first side and a second side;
a first metal deposition electrode, provided on a first surface of the first dielectric film, having a first low resistance portion, provided at the first side of the first dielectric film, with a lower resistance than other portions of the first metal deposition electrode;
a second metal deposition electrode, provided on a second surface of the first dielectric film, having a second low resistance portion, provided at the second side of the first dielectric film, with a lower resistance than other portions of the second metal deposition electrode; and
a plurality of metalized contacts connected to the first low resistance portion and the second low resistance portion, respectively, and insulated from each other, wherein
the first dielectric film has a band-shaped portion having no metal provided along the second side on the first surface,
the first metal deposition electrode comprises:
a plurality of first slits, provided in a central portion, in a direction from the first side to the second side of the first metal deposition electrode, extending at substantially regular intervals in a direction perpendicular to a direction from the first side to the second side;
a plurality of second slits that communicate with the first slits, provided at substantially regular intervals and extending perpendicular from the first slits toward the second side;
a plurality of third slits that communicate with the second slits, provided at substantially regular intervals and extending parallel to the first slits;
a plurality of fourth slits, respectively provided at a position where the plurality of second slits extend, such that the plurality of fourth slits are opened at the second side of the first metal deposition electrode and a plurality of intervals exist, respectively, between the plurality of fourth slits and the plurality of second slits; and a plurality of first fuses provided between the plurality of first slits, between the plurality of third slits, and between the plurality of second slits and the plurality of fourth slits, respectively, the second metal deposition electrode comprises:

a plurality of fifth slits provided in a central portion, in a direction from the first side to the second side of the second metal deposition electrode, extending at substantially regular intervals in the direction perpendicular to the direction from the first side to the second side;

a plurality of sixth slits that communicate with the fifth slits, provided at substantially regular intervals and extending from the fifth slits toward the first side;

a plurality of seventh slits that communicate with the sixth slits, provided at substantially regular intervals and extending parallel to the fifth slits; and a plurality of eighth slits respectively provided at a position where the plurality of sixth slits extend such that the plurality of eighth slits are opened at the first side of the second metal deposition electrode and a plurality of intervals exist, respectively, between the plurality of eighth slits and the plurality of sixth slits; and a plurality of second fuses provided between the plurality of fifth slits, between the plurality of seventh slits, and between the plurality of sixth slits and the plurality of eighth slits, respectively, and a location of the first slit deviates from a location of the fifth slit in the direction from the first side to the second side within 10% of a distance between the first side and the second side of the first dielectric film, when the film is plan viewed, wherein at least one of an angled portion of the plurality of first fuses and an angled portion of the plurality of second fuses is rounded, the plurality of first slits and the plurality of fifth slits have a width and a length, the plurality of first fuses have a flat portion having a length not shorter than half of the width of the plurality of first slits, when the angled portion of the plurality of first fuses is rounded, and the plurality of second fuses have a flat portion having a length not shorter than half of the width of the plurality of fifth slits when the angled portion of the plurality of second fuses is rounded.

2. The metalized film capacitor according to claim 1, further comprising a second dielectric film having a metal film formed on the second dielectric film and laminated with the first dielectric film.

3. The metalized film capacitor according to claim 1, further comprising a second dielectric film laminated with the first dielectric film, wherein a metal film is formed on a second surface of the first dielectric film.

4. An inverter smoothing capacitor for a vehicle comprising the metalized film capacitor according to claim 1.

* * * * *